United States Patent [19]

Mitzel

[11] 4,269,405

[45] May 26, 1981

[54] SEPARATING UNIT FOR FLAT SHEET MATERIAL

[75] Inventor: Wilhelm Mitzel, Neukeferloh, Fed. Rep. of Germany

[73] Assignee: GAO Gesellschaft fur Automation und Organisation mbH, Munich, Fed. Rep. of Germany

[21] Appl. No.: 50,977

[22] Filed: Jun. 22, 1979

[30] Foreign Application Priority Data

Jan. 19, 1979 [DE] Fed. Rep. of Germany ....... 2902068

[51] Int. Cl.[3] ............................................ B65H 3/12

[52] U.S. Cl. .................................... 271/94; 271/99; 271/106; 271/112; 271/122

[58] Field of Search ............... 271/109, 112, 113, 119, 271/122, 94, 95, 96, 99, 106

[56] References Cited

U.S. PATENT DOCUMENTS 3,549,067 12/1970 Robbins ............................ 271/94 X 3,976,291 8/1976 Bernardi ............................ 271/12

FOREIGN PATENT DOCUMENTS 1275548 8/1968 Fed. Rep. of Germany ............ 271/34

*Primary Examiner*—Richard A. Schacher

*Attorney, Agent, or Firm*—Andrus, Sceales, Starke & Sawall

[57] ABSTRACT

A separating unit for flat sheet material has a rotating separating drum with suction openings on its outer face. The material to be separated is run tangentially between the separating drum and a suction drum. The separating drum has suction holes ahead of the suction openings that initiate the evacuation of air between the sheet and drum by a pulling effect lower than that of the suction openings.

9 Claims, 2 Drawing Figures

SEPARATING UNIT FOR FLAT SHEET MATERIALS

BACKGROUND OF THE INVENTION

The invention relates to a separating unit for flat sheet material having a separating drum, able to be turned and which in its outer face has suction openings, and in which, in operation, the furthest forward piece of sheet material to be separated is run tangentially to the separating drum through a gap formed between the separating drum and a suction drum turning in the same direction, the sheet material being suction-gripped by way of suction openings on the outer face of the separating drum and being run into a transport system.

In the present case "flat sheet material" is to be taken to be, more specially, banknotes, bankpapers, data or other records and pages of papers with printed material or handwriting.

An account is given of a separating unit for flat sheet material in the German Offenlegungsschrift Specification No. 2,454,082, in which the piece of sheet material furthest to the front of a stack of material being transported is guided by way of a turning suction drum, which is placed, as seen in the direction of motion, at the back end of the stack, and by way of a shaker into a gap or slot, which is formed by a second turning suction drum and a still further turning suction drum, acting as a separating drum, and the separating drum and the second suction drum, the "keeping-back drum", are turned in the same direction. The second suction drum is responsible for keeping back or pushing back all that flat sheet material, which comes after the furthest-forward sheet of material, that is to say the piece of sheet material which is to the front. As a general rule, the leading edge of the sheet material to be separated is kept up against the keeping back roller till the suction openings, which, in comparison with the suction openings of the keeping back roller, have a very much greater suction force, of the separating roller take over the sheet material, so that it is pulled from the stack and handed over to the next part of the transport system. With this apparatus, a high-speed and trouble-free separating of flat sheet material is possible.

However, it is more specially in the case of high speeds of operation that the separate pieces of flat material are not suction-gripped by the suction openings of the separating roller, so that operation is not regular and sheets are not transported on every turn of the drum.

The cause for operation not being regular is that at very high speeds of separating there is not enough time for the leading edge of the furthest-forward piece of sheet material being moved up to be pulled from the keeping back drum, using the separating suction openings, over on to the separating drum. The operation of pulling over may furthermore be specially hard on processing specially stiff material to be transported.

The time in which the suction openings are able to take effect on the leading edge of the sheet material is, for this reason, less than the time needed by the leading edge for "jumping over" from the keeping back roller on to the separating drum.

In the case of the old apparatus it is lastly s shortcoming that the noise produced on separating the pieces of sheet material is generally loud, something which is more specially because the distance between the sheet material and the separating drum has to be crossed over very quickly at high speeds of operation of the apparatus, loud noises being produced by the sudden blowing or motion of air and the transported material being violently moved against a face of the apparatus.

SUMMARY OF THE PRESENT INVENTION

One purpose of the present invention is, for these reasons, that of designing a separating unit for flat sheet material in the case of which the shortcomings of old separating units are put to an end and is more particularly characterised in that it may be run at a high speed, is free of trouble in use, is regular and makes for less noise in use.

In the invention these and other purposes are effected in that the separating drum in its cylindrical casing has heading suction holes, which, in the direction of turning, are in front of the suction openings, and whose suction-pull is lower than that of the suction openings.

Preferably these suction holes are parallel to the axis of turning of the separating drum, that is to say are lined-up parallel to it.

Because of the presence of the heading suction holes of the separating drum, which are in front of the suction openings in the direction of pulling, it is possible to make certain that the incoming furthest-forward piece of sheet material is pulled up against the separating drum before the suction openings are functioning, or that between the separating drum and the keeping back roller, the pressure has been lowered to such a degree that a pulling over of the sheet material is speeded up, when the suction openings come to take effect. This makes certain that the separating unit may be worked even at high speeds regularly, that is to say with the transport of a sheet for every turn of the separating drum.

Because the heading suction holes, before separating takes place, are responsible for pulling the sheet material over towards the separating drum slowly, or at least have the effect of clearing air from the space between the sheet material and the separating drum before time as it were, the noise produced by the separating of the material is greatly decreased because the material is not so suddenly stopped in its motion and because there is very much less motion of the air by being pushed out of the way.

The heading suction holes are so designed that, although in some cases they are responsible for moving the sheet of material against the separating drum, they certainly do not have the effect of moving the material on further in the direction of turning of the drum and this transport is in fact effected by the suction openings. This is made possible because the heading suction holes are made with a smaller cross-sectional area than the suction openings. With small heading suction holes, the air, it is true, is cleared from the space between the sheet material and the drum and, for this reason, the sheet material may, in some cases, be pulled over to the drum itself, but, however, the force will not be great enough for causing the sheet material to be moved round with the drum.

The size of the heading suction holes may be designed within very wide limits. It is quite clear that their size is dependent, amongst other things, on the number of heading suction holes, on the degree of vacuum used, on the nature of the sheet material and on the speed at which the separating unit is worked. The lower limit for the cross-sectional area of the heading suction holes will be seen by one trained in the art to be dependent on the fact that the holes have to be in line with the conditions noted earlier. On the other hand the size of the heading suction holes has a top limit in as far as transport of the sheet material with the separating drum, because of the effect of the heading nozzles, is undesired.

It is only the suction openings of the separating drum, which later come to take effect on the sheets of the material, which are responsible for suction-gripping the material to be transported and moving it on in the direction of turning. As has been more specially noted earlier, the suction openings have greater cross-sectional areas than the heading suction holes. In a preferred form of the invention the drum outer face near the suction openings may be designed with an increased coefficient of friction so that further motion or transport of the sheet material is made certain of. For this purpose it is possible to make use, for example, of rubber rings placed round the suction openings. Furthermore a land placed running over the complete height of the drum near the suction openings, of material with an increased coefficient of friction may be used to the same end.

At the heading suction holes no material increasing the static coefficient of friction is to be used, because it is in this respect a question of stopping any transport of the sheet material by this part of the drum.

In accordance with a preferred form of the invention the drum outer face near the heading suction holes is made with the lowest possible coefficient of friction.

BRIEF DESCRIPTION OF THE DRAWING

An account of a preferred working example of the invention using the figures will now be given.

DETAILED DESCRIPTION OF THE PREFERRED EMBODIMENT

Figure 1:
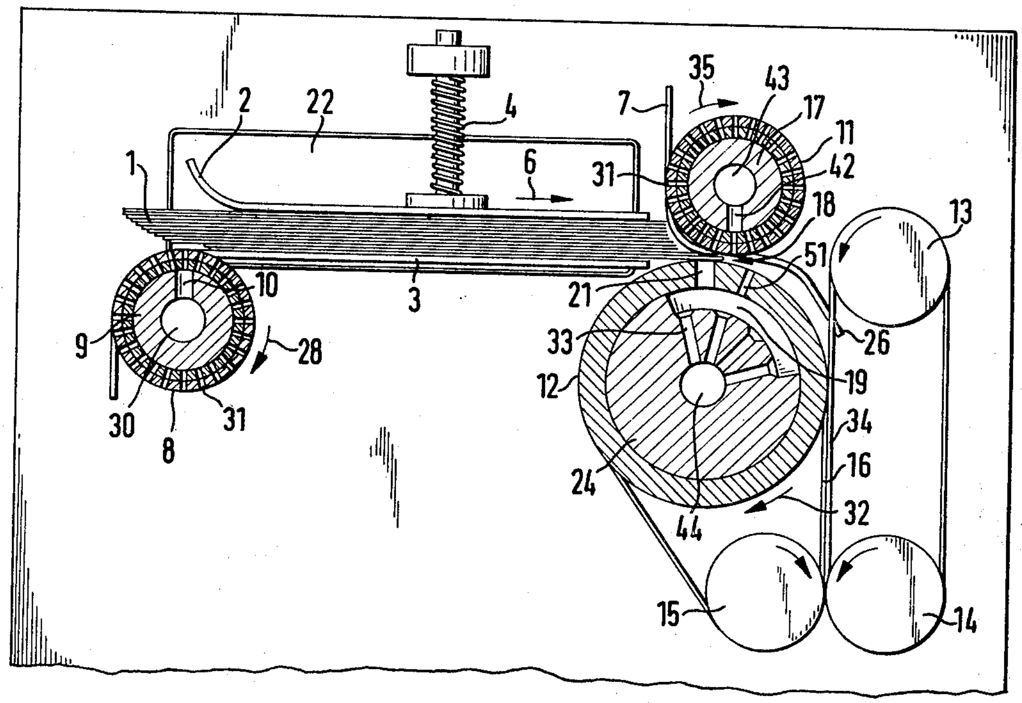
FIG. 1 is a diagrammatic view of the separating unit taking the form of one working example of the invention.

In FIG. 1 the one working example of the separating unit is to be seen diagrammatically, no parts not necessary for the account of the invention being figured. The stack 1 of sheet material to be transported or separated is pushed, for example by the spring 4 and the pushing plate 2, against the stop plate 3 in such a way that the flat material is positioned in the form of a parcel. In this working example of the invention the material is placed in an upright position, although it may furthermore be placed horizontally.

The stack 1 is supported on a lower plate 22, which is more specially joined with a shaker (not figured). The stack 1 is moved by the shaking motion in the direction as arrowed 6 towards the keeping back comb 7.

The forward motion drum 8 is a suction drum turning in the direction as arrowed 28. The core of the suction drum 8 takes the form of an unmoving concentric roller 9 (stator) acting as a valve part, because it has an airway 10, which is joined with a vacuum system by way of the hollow pin 30. Because the suction drum has evenly spaced airways 31 at its outer face, while the roller 9 only has one single airway, 10, the furthest forward piece of sheet material of the stack 1 is suction-pulled at a certain point in time. In this way the furthest forward piece of sheet material is moved in the direction of the arrow 6 at the desired point in time.

The keeping back comb 7 is responsible for making certain that only the furthest forward sheet of material is run into the gap 18, which is formed between the separating drum 12 and the keeping back roller 11. The keeping back roller 11 is in its design the same as the moving forward drum 8. The keeping back roller is turned in the direction of the arrow 35 and has an unmoving roller 17 with an airway 42, which is joined with a vacuum system by way of the hollow pin or shaft 43. In the turning drum airways 31 are placed.

The separating drum 12 is turned in the direction of the arrow 32 on the unmoving concentric valve part 24, which has a number of airways 33 in the opening part 19, put under vacuum by way of the hollow shaft 44. Parallel to the axis of turning of the drum suction openings 21 are placed. The opening in the valve part 19 has such an adjustment that the suction air takes effect till the furthest forward sheet of material is strongly suction-gripped near its leading edge and has been pulled into the transport system with the belts 16 and 34 and the driving rollers 13, 14 and 15.

The keeping back comb 7 may be so designed at its end 26 as to be stretching into the transport system.

In the separating drum 12, in the direction of transport before the suction openings 21, heading suction holes 51 are placed, which like the suction openings 21 are joined up with the vacuum system by way of the opening part 19, the airways 33 and the hollow shaft 44.

Figure 2:
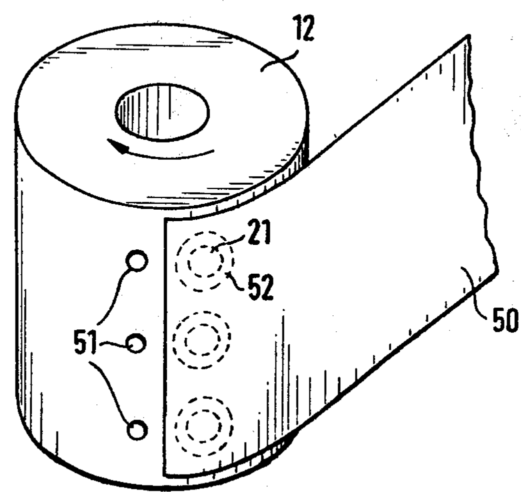
FIG. 2 is a diagrammatic perspective view of the separating drum with a piece of sheet material placed against it.

The system of the heading suction holes 51 on the separating drum 12 is to be clearly seen in FIG. 2. The separating drum 12 is turned in the direction of the arrow. As will be clear from the figure, the heading suction holes 51 are not covered by the sheet of material while it is being transported. The cross-sectional area of the heading suction holes is less than that of the suction openings. It is made clear in FIG. 2 that the suction openings 21 have rubber rings 52 placed round them for producing an increased static friction between the sheet 50 of material and the roller 12.

The position, and furthermore the number, of heading suction holes is dependent on design and the conditions on hand and, if the functions noted earlier are effected, may be changed within broad limits.

The distance of the heading suction holes from the main suction opening is more specially made of such a size that even in the case of the highest separating speed, the pieces of material are separated in the desired way. If in the case of slower speeds of separating, the heading suction holes are made longer at the position where they take effect, this will not be the cause of any trouble or undesired effects, because their transporting force will not be high enough for moving any sheet material which may be on the separating drum, in the direction of transport.

As will be clear from FIG. 2, use is more specially made of three suction openings and three heading suction holes, which are each placed along a line on the outer face of the separating roller. More specially, the heading suction holes are about 0.5 to 1.5 cm in front of the suction openings and are placed at the same level as them.

The suction openings may be of round or long form and, for example, have a cross-sectional area of about 40 $mm^2$.

The heading suction holes are more specially round and have, for example, a diameter of 2.5 mm.

Normally the separating unit is worked with a vacuum level of about 6 bar and a speed of 5 to 40 rps.

More specially the relation between the cross-sectional area of the heading suction holes and that of the suction openings is between about 1:4 and 12.

I claim:

1. A high speed separating unit for separating and advancing sheets of flat material tangentially applied from a stack thereof, said unit having a rotatable separating drum (12) with suction openings (21) on the exterior thereof exerting a predetermined amount of suction for adhering said sheets to the exterior of said drum for separation and advancement, said separating drum having suction holes (51) preceding said suction openings in the direction of turning, said suction holes exerting a lesser amount of suction than said suction openings insufficient by itself to advance the sheets.

2. A separating unit as claimed in claim 1, characterised in that the suction holes (51) have a smaller cross-sectional area than the suction openings (21).

3. A separating unit as claimed in claim 1, characterised in that the suction holes (51) and main suction openings (21) are each placed in lines parallel to the axis of turning of the separating drum.

4. A separating unit as claimed in claims 1, 2, or 3 characterised in that the suction holes are present in a number equal to the number of main suction openings.

5. A separating unit as claimed in claims 1 or 3, characterised in that the suction holes (51) and the main suction openings (21) are arranged on the same circumferential peripheral lines of the separating drum.

6. A separating unit as claimed in claim 1, characterised in that the drum outer face near the suction openings (21) has an increased coefficient of friction.

7. A separating unit as claimed in claim 1, characterised in that the drum outer face near the suction holes (51) is designed with the lowest possible coefficient of friction.

8. A separating unit as claimed in claim 6, characterised in that rubber rings (52) are placed round the suction openings (21).

9. A separating unit as claimed in claim 6, characterised in that at the suction openings (21) there is a land, running over the complete height of the drum, of material with an increased coefficient of friction.

* * * * *